US006848100B1

(12) United States Patent
Wu et al.

(10) Patent No.: US 6,848,100 B1
(45) Date of Patent: Jan. 25, 2005

(54) HIERARCHICAL SOFTWARE PATH PROFILING

(75) Inventors: Youfeng Wu, Palo Alto, CA (US); Ali Adl-Tabatabai, Santa Clara, CA (US); David A. Berson, Marietta, GA (US); Jesse Fang, San Jose, CA (US); Rajiv Gupta, Tucson, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,399

(22) Filed: Mar. 31, 2000

(51) Int. Cl.$^7$ ............................................. G06F 9/45
(52) U.S. Cl. ................................... 717/157; 717/133
(58) Field of Search ............................... 717/130–133, 717/151–158; 714/37; 709/220; 345/853

(56) References Cited

U.S. PATENT DOCUMENTS

| | | | | |
|---|---|---|---|---|
| 5,161,216 A | * | 11/1992 | Reps et al. ................ | 717/151 |
| 5,355,487 A | * | 10/1994 | Keller et al. ............... | 717/127 |
| 5,515,487 A | * | 5/1996 | Beaudet et al. ............. | 345/440 |
| 5,828,883 A | * | 10/1998 | Hall ........................... | 717/130 |
| 5,894,576 A | * | 4/1999 | Bharadwaj .................. | 717/156 |
| 6,029,004 A | * | 2/2000 | Bortnikov et al. .......... | 712/214 |
| 6,108,698 A | * | 8/2000 | Tenev et al. ................ | 709/220 |
| 6,145,076 A | * | 11/2000 | Gabzdyl et al. ............. | 712/241 |
| 6,170,083 B1 | * | 1/2001 | Adl-Tabatabai ............. | 717/118 |
| 6,327,699 B1 | * | 12/2001 | Larus et al. ................. | 717/128 |
| 6,381,739 B1 | * | 4/2002 | Breternitz et al. ........... | 714/37 |
| 6,400,383 B1 | * | 6/2002 | Geisler et al. .............. | 345/855 |

OTHER PUBLICATIONS

Muchnick, "Advanced Compiler Design and Implementation", Morgan Kaufmann Publishers, Inc.; 1997.*
Aho et al., "Compilers: Principles, Techniques, and Tools"; Bell Telephone La boratories, Incorporated; 1996.*
Steven S. Muchnick; "Advanced Compiler Design Implementation"; Morgan Kaufmann Publishers, Inc.; 1997; pp. 169–177.*
Douglas G. Fritz; "An Overview of Hierarchical Control Flow Graph Models", Proceedings of the 1995 Winter Simulation Conference; 1995; pp. 1347–1355.*
"Program Dependence Graph"; IBM Technical Disclosure Bulletin, vol. 27, No. 12; May 1985; pp. 7221–7224.*
Muchnick, Steven S.; "Advanced Compiler Design Implementation"; Morgan Kaufmann Publishers, Inc.; 1997; pp. 607–610, 619–622 (excerpts from chapter 19).*
"Dictionary of Computing"; Fourth Edition; Oxford University Press; 1996; pp. 470–471.*
Mataga et al., "Edge Profiling versus Path Profiling: The Showdown"; POPL 98, ACM, 1998, p. 134–148.*
Young et al. "Better Global Scheduling Using Path Profiles", IEEE, 1998, pp. 115–123.*
Larus, "Whole Program Paths", SIGPLAN '99, ACM, 1999; pp. 259–269.*
Ammons et al. "Exploiting Hardware Performance Counters with Flow and Context Sensitive Profiling", PLDI '97, ACM, 1997; pp. 85–96.*
Ball, T., et al., "Efficient Path Profiling", *Proceedings of the 29th Annual IEEE/ACM International Symposium on Microarchitecture*, 46–57, (Dec. 2–4, 1996).

* cited by examiner

*Primary Examiner*—Kakali Chaki
*Assistant Examiner*—William H. Wood
(74) *Attorney, Agent, or Firm*—Schwegman, Lundberg, Woessner & Kluth, P.A.

(57) ABSTRACT

A hierarchical software profiling mechanism that gathers hierarchical path profile information has been described. Software to be profiled is instrumented with instructions that save an outer path sum when an inner region is entered, and restore the outer path sum when the inner region is exited. When the inner region is being executed, an inner path sum is generated and a profile indicator representing the inner path traversed is updated prior to the outer path sum being restored. The software to be profiled is instrumented using information from augmented control flow graphs that represent the software.

39 Claims, 10 Drawing Sheets

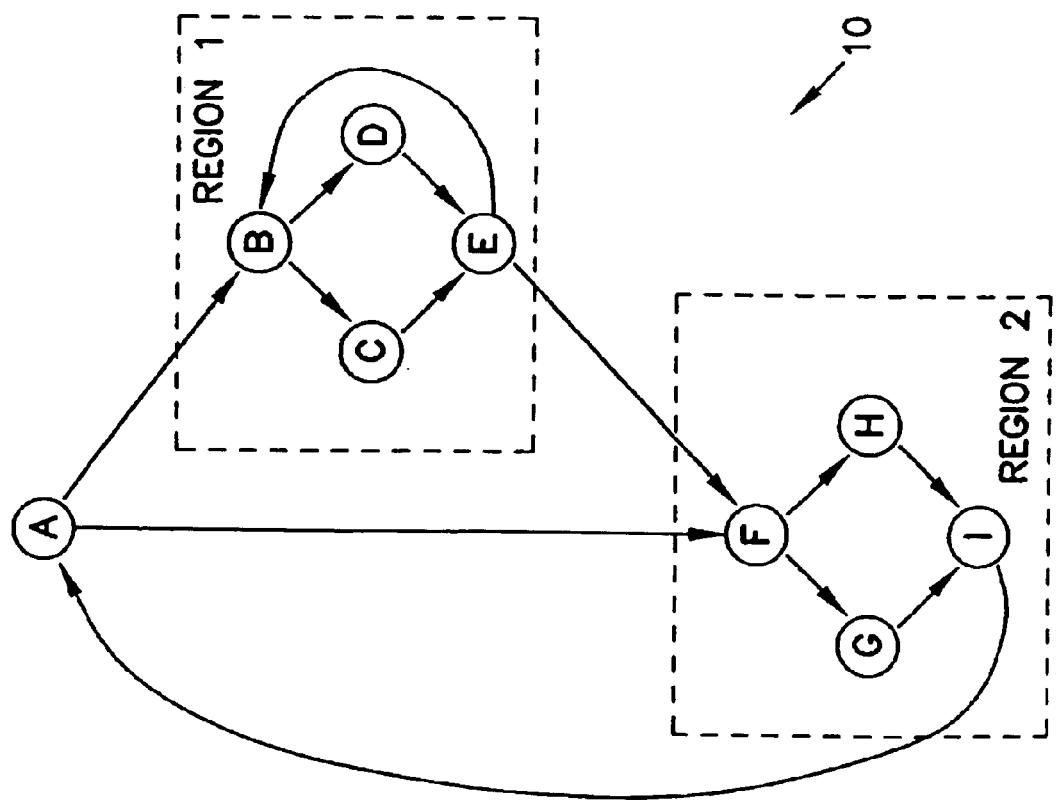

| $R_1$ PATHS | FIG. 4A PATHS | PATH SUMS |
|---|---|---|
| CD | $R_e$ CDR$_x$ | 0 |
| CDF | $R_e$ CDFR$_x$ | 1 |
| CEF | $R_e$ CEFR$_x$ | 2 |
| EF | $R_e$ EFR$_x$ | 3 |

| R REGION | HIERARCHICAL PATH | FIG. 8A PATHS | PATH SUM |
|---|---|---|---|
| $R_1$ | CD<br>CDF<br>CEF | ACDI<br>ACDFI<br>ACEFI | 0<br>6<br>9 |
| $R_2$ | $BR_1$<br>$BR_1G$ | ABCDI<br>ABCDGI | 10<br>13 |
| $R_3$ | $AR_2HI$ | ABCDHI | 11 |

HIERARCHICAL SOFTWARE PATH PROFILING

FIELD OF THE INVENTION

The present invention relates generally to software, and more specifically to the profiling of software.

BACKGROUND OF THE INVENTION

When software is compiled, it is converted from a high level "human readable" set of statements to a set of low level "machine readable" instructions. The control flow of the machine readable instructions can be very much like that of the human readable statements, or can be very different. During compilation, software can be "optimized" to increase the speed with which the final machine readable code executes.

Optimizing compilers can benefit from profiling information that is collected when the program runs. Typical profiling operations collect information such as: block profiles, which represent the frequency of execution of blocks of code; edge profiles, which represent the frequency of taken branches in and out of blocks of code; and path profiles, which represent sequences of taken edges. Path profiles differ from block and edge profiles in that path profiles represent the execution frequency of control flow paths traversed in the software program, whereas block and edge profiles represent the frequency of execution of smaller elements within the software program.

A path profiling method hereinafter referred to as the "BL method" is presented in: Thomas Ball & James Larus, "Efficient Path Profiling," MICRO-29, December 1996. The BL method generates a path profile for each "plain path" in a software function. For the purposes of this description, a plain path is a path that starts at a function entry or a loop entry (if the loop enters from a back edge), and ends at a function exit or a loop exit (if a back edge is taken at the exit node). FIG. 1A shows a control flow graph (CFG) 10, and FIG. 1B shows the paths within CFG 10 that are profiled when the BL method is used. The profiled paths include paths 20 from the function entry (node A) to the function exit (node 1), paths 30 from the function entry (node A) to a loop exit (node E), paths 40 from a loop entry (node B) to a loop exit (node E), and paths 50 from a loop entry (node B) to the function exit (node I).

The term "region" as used herein, refers to a sub-graph of a control flow graph. The regions are either nested or disjoint. Region-based compilers may treat the hammock made up of nodes B, C, D, and E as an inner region, shown as region 1 ($R_1$) in FIG. 1A. Similarly, the hammock made up of nodes F, G, H, and I, shown as region 2 ($R_2$) in FIG. 1A, may also be treated as a region by a region-based compiler. Region-based compilers may benefit from path profile information for the separate regions in part because local optimizations can be made within regions. CFG 10 can be viewed as a hierarchical CFG in that regions 1 and 2 are inner regions, and all of CFG 10 is an outer region with the inner regions represented as single nodes in the graph.

"Hierarchical path profiles" are path profiles that include separate profiles for paths within inner regions, and for paths in outer regions. Paths in outer regions have inner regions represented as single nodes. For example, a hierarchical path profile of CFG 10 would include profiles for paths FGI and FHI, which are paths within inner region 2, and would also include profiles for $AR_2$ and $AR_1R_2$, which are outer region paths having inner regions represented as single nodes. The BL method does not generate hierarchical path profiles. For example, the BL method does not generate separate path profiles for paths FGI, FHI, $AR_2$, and $AR_1R_2$ that include the total execution counts for the specific paths.

For the reasons stated above, and for other reasons stated below which will become apparent to those skilled in the art upon reading and understanding the present specification, there is a need in the art for a method and apparatus for profiling hierarchical software paths.

BRIEF DESCRIPTION OF THE DRAWINGS

FIGS. 1A and 1B show a control flow graph and a list of paths profiled using a prior art method;

DESCRIPTION Of EMBODIMENTS

Figures 2A, 2B:
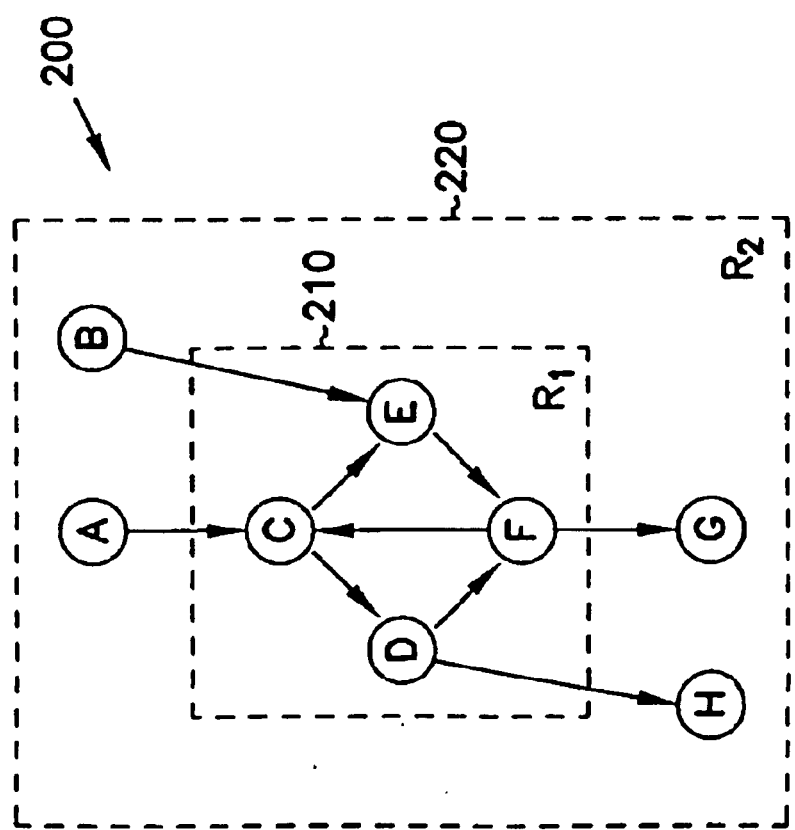
FIGS. 2A and 2B show a first hierarchical control flow graph and the corresponding hierarchical paths.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for generating hierarchical path profiles for software programs. Control flow graphs representing software programs are modified, or "augmented," the BL method is utilized to generate edge values, and the software is modified, or "instrumented," to sum edge values along paths as they execute. Summed edge values represent "path sums" that are used to index into an array of profile indicators. In some embodiments, the profile indicators are counters that are incremented each time the corresponding path is executed.

In some embodiments, hereinafter referred to as "region-based embodiments," the CFG for the software program is separated into multiple CFGs, one for each region in the hierarchy. Path sums within each region are unique within the region, and each region has a separate array of profile indicators. This allows path sums to be reused from region to region.

In other embodiments, hereinafter referred to as "global-based embodiments," the CFG for the software program is not separated into separate CFGs for each region. Instead, the CFG is augmented using techniques that, when the BL method is applied, generates path sums for hierarchical paths that are unique within the software program represented by the CFG. In global-based embodiments, a single array of profile indicators can be used for the software program.

For ease of explanation, this description is organized such that the region-based embodiments and global-based embodiments are, for the most part, described separately; however, one skilled in the art will understand that these embodiments are not mutually exclusive, and that they may be combined without departing from the scope of the invention.

Region-Based Embodiments

FIGS. 2A and 2B show a hierarchical control flow graph and the corresponding hierarchical paths. FIG. 2A shows CFG 200 that includes outer region 220 and inner region 210. Each hierarchical path within CFG 200 is shown in FIG. 2B as a list of nodes. A path is traversed when the corresponding nodes are visited as the software code within the region is executed. Within region 210, the possible paths are CD, CEF, CDF, and EF, shown as paths 230 in FIG. 2B. Region 210 has two entry nodes, C and E, and has two exit nodes, D and F. Paths 230 represent all possible paths from each entry node to each exit node within region 210.

Region 210 is also labeled R., and region 220 is also labeled $R_2$. The "R" designation refers to the region in the software program, and the numbered region designation refers to the region as represented by the CFG. In FIGS. 2A–6B, modified versions of CFG 200 are presented as different CFGs. The numbered designations change from figure to figure because the CFG has undergone change, but the "R" designations do not change so that the underlying software regions can be tracked from figure to figure as the CFG changes. Numbered designations and "R" designations are sometimes used interchangeably in this description, but in general, discussions of the CFG refer to regions by number, and discussions of regions in the software hierarchy refer to regions by "R" designation.

FIG. 2B also shows hierarchical paths 240 for outer region 220. Hierarchical paths treat inner regions as single nodes. For example, in paths within region 220, region 210 is listed as a single node represented as R. The possible paths within region 220 are listed as $AR_1H$, $AR_1G$, $BR_1H$, and $BR_1G$. Region 220 has two entry nodes, A and B, and has two exit nodes, H and G. Paths 240 represent the possible permutations from each entry node to each exit node within region 220.

CFG 200 is a sub-graph of a larger graph (not shown) that represents a larger portion of the software program, and as a result, region 220 is a region at an intermediate level in the hierarchy of a software program. CFG 200 includes inner region 210 that is at a lower level in the hierarchy than region 220. Likewise, region 220 represents an inner region to the next level outer region (not shown). The method of the present invention can be applied at all levels of the hierarchy. In this description, the method is described with respect to the two levels of hierarchy represented by region 210 and region 220.

An overview of the region-based embodiments is now presented. Further detailed descriptions are provided below. Separate CFGs for each region are created in the region-based embodiments. To effect this, each region is represented at the next higher hierarchical level by a single node. The single node is chosen as one of the entry nodes in the region, hereinafter referred to as the "representative entry node." When inner regions are replaced in the CFG by their respective representative entry nodes, the CFG is augmented with extra nodes and edges if necessary, and edge values are assigned using the BL method. This is repeated for all CFGs representing different regions. The software is instrumented by inserting profiling instructions, and when the software is executed, hierarchical profile information is gathered.

Figures 3A, 3B:
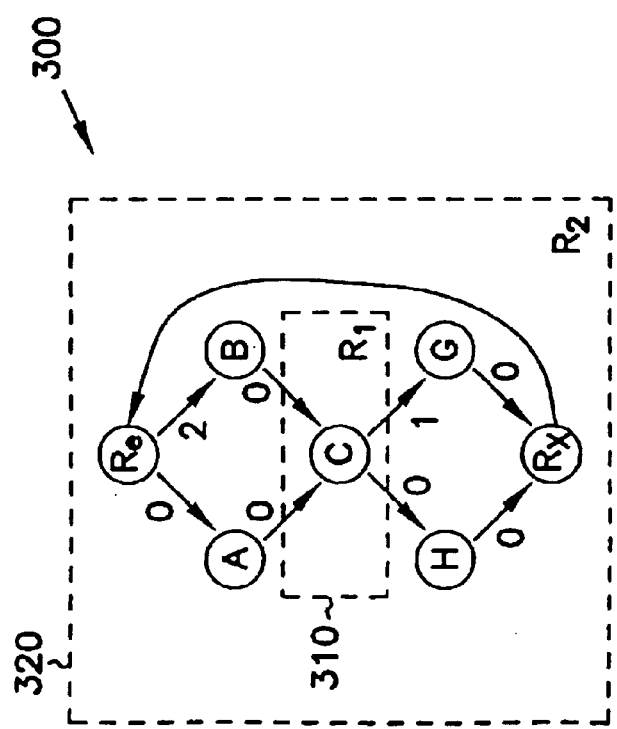
FIGS. 3A and 3B show a first augmented control flow graph and the corresponding profiled paths in accordance with a region-based embodiment.

Augmenting Control Flow Graphs and Assigning Edge Values in Region-Based Embodiment FIGS. 3A and 3B show a first augmented control flow graph and the corresponding profiled paths in accordance with a region-based embodiment. FIG. 253A shows augmented CFG 300 that corresponds to region 220 (FIG. 2A). Region 220 has been modified, and appears in FIG. 3A as region 320. Modifications include: the inner region being replaced by a representative entry node, which in this example is node C; and the addition of a region source node Re and a region sink node Rx.

In general, region-based augmentation of CFGs follows the outline presented as numbered actions below. The numbering is provided for clarity in organization and does not imply an order of operations. Indeed, the order can be different than that presented without departing from the scope of the present invention. Each action is presented in more detail after the outline. The current region is denoted as "R," and inner regions are denoted as "r." The CFG for the current region is denoted as CFG(R), and the CFG for inner regions is denoted as CFG(r).

Outline of Region-Based Augmentation:
1. Remove all backedges.
2. Create a region source Re and connect it to all entry nodes of CFG(R).
3. Create a region sink Rx and connect all exit nodes of CFG(R) to it.
4. Add an edge from Rx to Re.
5. For each inner region r of R:
   5a. Replace CFG(r) with r's representative entry node, Er(r).
   5b. Add an edge from each prolog node of r in CFG(R) to Er(r).
   5c. Add an edge from Er(r) to each epilog node of r in CFG(R).

Further Description of Region-Based Augmentation:
1. Remove all backedges. Source nodes of backedges are treated as region exits, and target nodes of backedges are treated as region entries. When a backedge is removed, the source node of the backedge is marked as a region exit, and all actions taken with respect to region exit nodes are also taken with respect to the backedge source node. The target node of the backedge is marked as a region entry, and all actions taken with respect to region entry nodes are also taken with respect to the backedge target nodes. Region 220 does not have a backedge, but region 210 does. The backedge of region 210 is edge F->C. This is discussed further below with reference to FIG. 4A.

2. Create a region source Re and connect it to all entry nodes of CFG(R). Node Re is created and added to CFG 300. Edges Re->A and Re->B are also added. If a backedge had been removed, the backedge target node would be treated as an entry node, and an edge would have also been added from Re to the backedge target node.

3. Create a region sink Rx and connect all exit nodes of CFG(R) to it. Node Rx is created and added to CFG 300. The exit nodes for CFG($R_2$) are nodes H and G. Edges H->Rx and G->Rx are created and added to CFG 300. If a backedge had been removed, the backedge source node would be treated as an exit node, and an edge would have also been added from the backedge source node to Rx.

4. Add an edge from Rx to Re. This is an edge that is added prior to applying the BL method to the augmented CFG.

5. Actions that are applied to each inner region r of CFG(R) are discussed in 5a–5c. In the example being presented, a single inner region "r" shown as $R_1$ exists.

5a. Replace CFG(r) with r's representative entry node, Er(r). The representative entry node can be chosen at random. It is used as a node to take the place of CFG(r) in the hierarchy, and can be any entry node within CFG(r). In this example, Er(r) could be either of nodes C or E. Node C is chosen as Er(r).

5b. Add an edge from each prolog node of r in CFG(R) to Er(r). A prolog node is a node at least one level up in the hierarchy that is a source node for an edge having an entry node of r as a target. For example, in FIG. 3A, nodes A and B are prolog nodes for region 310. When multiple entry nodes exist in a region, as is the case in the example, one is chosen as the representative entry node E(r). In this case, at least one prolog node will have an edge that has as a target node an entry node that has been removed from the CFG. Adding an edge from each prolog node to Er(r) insures that the appropriate paths continue to traverse the inner region r. If an edge already exists, a new one need not be added. For example, the edge A->C already existed in the CFG and so a new one is not added. In this example, edge B->C is added in action 5b.

5c. Add an edge from Er(r) to each epilog node of r in CFG(R). An epilog node is a node at least one level up in the hierarchy that is a target node for edges having an exit node of r as a source. For example, in FIG. 3A, nodes H and G are epilog nodes for region 310. The exit nodes of the inner region were removed when CFG(r) was replaced with Er(r). Adding edges from Er(r) to epilog nodes preserves the paths that traverse the inner region r. In this example, edges C->H and C->G were added.

After undergoing the augmentation process, the control flow graph is in a form that can be subjected to the BL method. As shown in FIG. 3B, each plain path 340 in CFG 300 corresponds to a hierarchical path 240 shown for region 220 (FIG. 2A). The BL method assigns edge values such that each plain path in the augmented CFG receives a unique path sum. For the case of augmented CFG 300, each plain path corresponds to a hierarchical path for a region, and so the unique path sums correspond to hierarchical paths.

The edge values assigned by the BL method are shown next to the edges in FIG. 3A. For example, edge Re->A has an edge value of zero and edge Re->B has an edge value of two. Path sums are generated by summing the edge values along the paths as they are traversed. For example, path ReBCGRx has a path sum of three because both edges Re->B and C->G are traversed on the path. The code that generates the path sums during execution and the arrangement of the profile n indicators are discussed below. First, the augmentation of the inner region CFG is discussed with reference to FIGS. 4A and 4B.

Figures 4A, 4B:
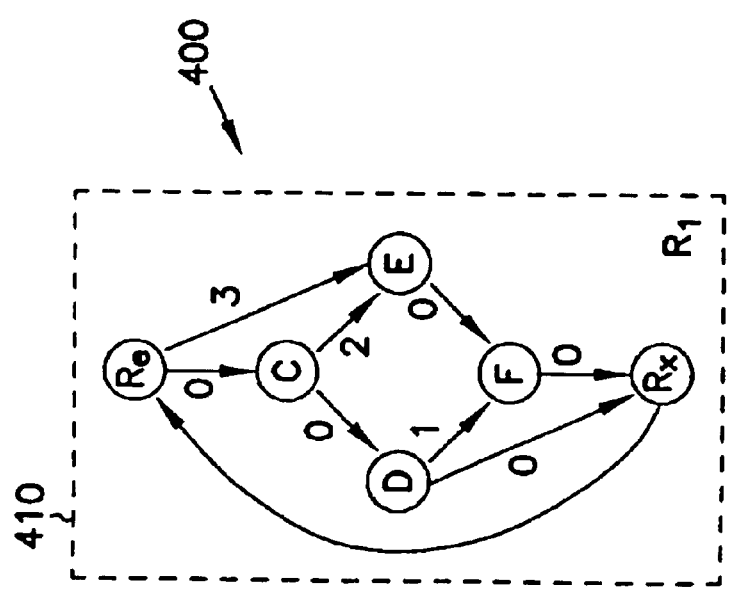
FIGS. 4A and 4B show a second augmented control flow graph and the corresponding profiled paths in accordance with a region-based embodiment.

FIGS. 4A and 4B show a second augmented control flow graph and the corresponding profiled paths in accordance with a region-based embodiment. FIG. 4A shows an augmented CFG 400 that corresponds to region 210 (FIG. 2A). Region 210 has been modified, and appears in FIG. 4A as region 410. Modifications include the addition of a region source node Re and a region sink node Rx.

The actions used to augment CFG 400 are the same as those used to augment CFG 300 (FIG. 3A). Each action, as applied to CFG 400, is now presented. The current region is denoted as "R," and inner regions are denoted as "r." The CFG for the current region is denoted as CFG(R), and the CFG for inner regions is denoted as CFG(r).

1. Remove all backedges. Backedge F->C is removed. As a result, F is treated as a region exit and C is treated as a region entry. Because F is already a region exit and C is already a region entry, they are not treated differently as a result of the removal of the backedge F->C.

2. Create a region source Re and connect it to all entry nodes of CFG(R). The region source Re is created and added to CFG 400. Nodes C and E are entry nodes for region 410. Edges Re->C and Re->E are added to CFG 400.

3. Create a region sink Rx and connect all exit nodes of CFG(R) to it. The region sink node Rx is created and added to CFG 400. Nodes D and F are exit nodes for region 410, so edges D->Rx and F->Rx are created and added to CFG 400.

4. Add an edge from Rx to Re. The edge Rx->Re is shown added to CFG 400 in FIG. 4A.

5a–5c. Actions performed for each inner region are not applicable to region 410 because there are no inner regions. In the hierarchical control flow graph originally presented in FIG. 2A, region 210, which corresponds to region 410 in FIG. 4A, is the inner-most region present. Therefore, there are no more inner regions to replace with representative nodes, and there are no prolog nor epilog nodes.

After undergoing the augmentation process, the control flow graph is in a form that can be subjected to the BL method. As shown in FIG. 4B, each plain path 440 in CFG 400 corresponds to a hierarchical path 230 shown for region 210 (FIG. 2A). The BL method assigns edge values such that each plain path in the CFG receives a unique path sum. For the case of augmented CFG 400, each plain path corresponds to a hierarchical path for a region, and so the unique path sums correspond to hierarchical paths.

The edge values assigned by the BL method are shown next to the edges in FIG. 4A. For example, edge Re->C has an edge value of zero and edge Re->E has an edge value of three. Path sums are generated by summing the edge values along the paths as they are traversed. For example, path ReEFRx has a path sum of three because edge Re->E is the only traversed edge having a non-zero edge value assigned. Path sums 450 are unique within CFG 400, but are not unique when considering both CFG 300 (FIG. 3A) and CFG 400. Stated differently, path sums for two paths in different regions may be the same. For example, both path ReACGRx (FIG. 3B) which represents a path in region 220 (FIG. 2A), and path ReCDFRx which represents a path in region 210 (FIG. 2A), have a path sum equal to one. This does not cause an ambiguity because of the profile indicator storage mechanism used in region-based embodiments. This is more fully described below with reference to FIG. 6.

Software Instrumentation in Region-Based Embodiments

Figure 5:
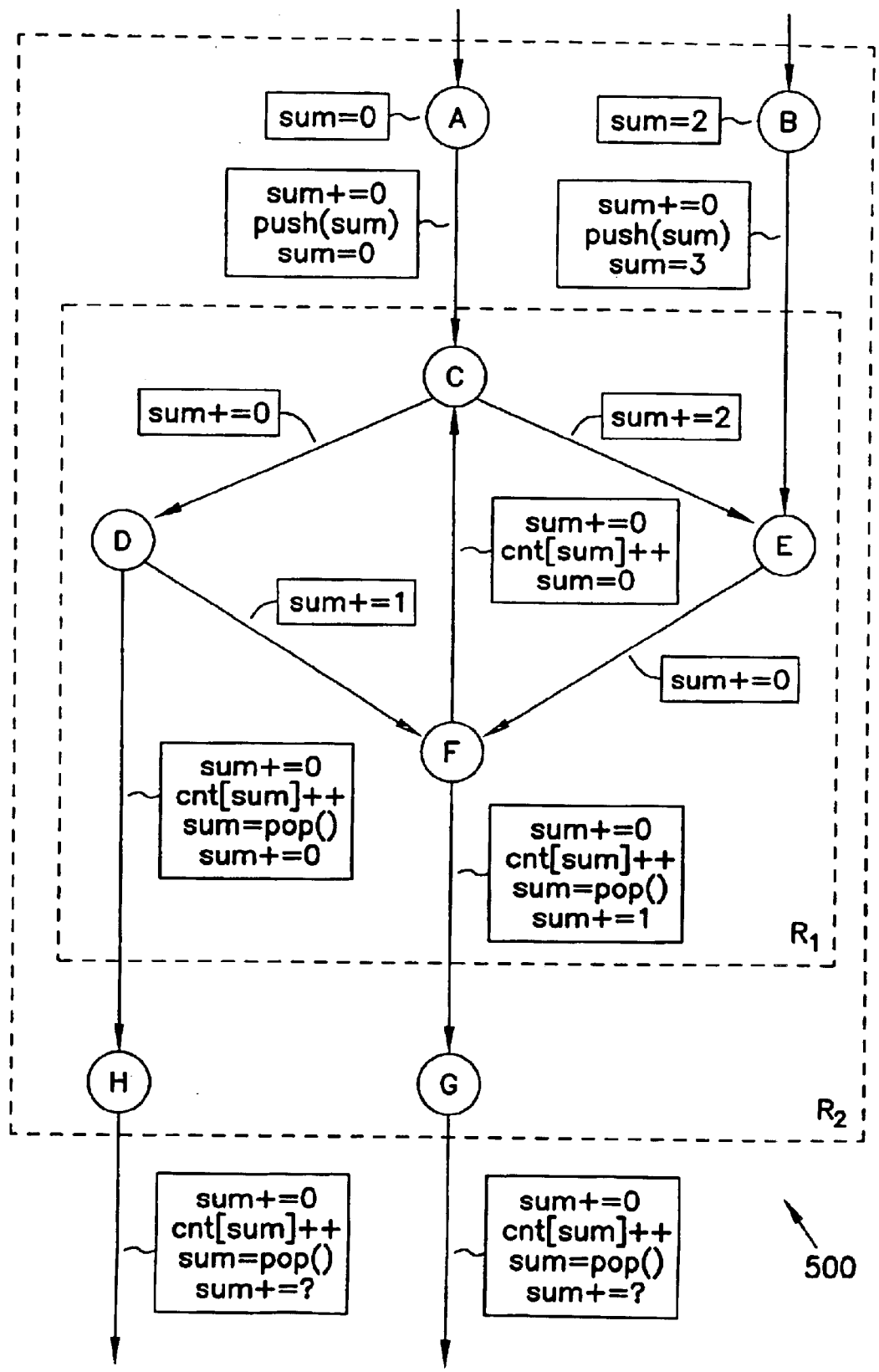
FIG. 5 shows software instrumentation in accordance with a region-based embodiment.

FIG. 5 shows software instrumentation in accordance with a region-based embodiment. The instrumentation includes instructions inserted into the program code. As a result of the instrumentation, profile indicators are modified when the program is executed. One profile indicator is maintained for each hierarchical path present in the program.

The original program is instrumented such that when a path P in a region completes execution, a variable holds the sum value of path P. The augmented CFGs (CFG 300 and CFG 400) provide information for instrumenting edges and blocks in the original CFG (CFG 200) to obtain the sum values and modify profile indicators. The original CFG is shown in FIG. 5 with appropriate instrumentation added.

The instrumented program saves the current outer path sum when entering a region, and restores the outer path sum when exiting the region. In between, the path sum is used to collect path information for the hierarchical path in the inner region. For example, in FIG. 5, the path sum is maintained in a variable named "sum." The path sum has an edge value of zero summed therewith on the execution of edge A->C because that is the edge value of edge A->C in region 320 (FIG. 3A). The path sum (which is now an outer path sum) is then pushed onto a stack for storage while execution continues in inner region Ra. The path sum is then initialized to zero because the edge value assigned to edge Re->C in CFG 400 is zero. If execution follows path CEF, an edge value of two is summed on edge C->E and zero is summed on edge E->F. After execution of block F, but before leaving inner region $R_1$, zero is again summed into the path sum because that is the edge value on edge F->Re. The resulting path sum within inner region $R_1$ is two, signifying that path CEF has been traversed. The statement "cnt[sum]+" increments the profile indicator in the appropriate profile indicator array, and then the outer path sum that was previously saved is popped from the stack. At this point, the hierarchical path profiling of the inner region $R_1$ is complete, and any further edge values that are summed correspond to the path in region $R_2$.

The remaining instrumentation in CFG 500 works in substantially the same manner. In general, when a region is entered, the outer path sum is saved, and the inner path sum is initialized. Edge values on the inner path are summed as the edges are traversed, and when the region exits, a profile indicator is updated and the outer path sum is restored.

In the example embodiment of FIG. 5, only two levels of hierarchy are present. Region $R_2$ is an outer region and region $R_1$ is an inner region. In practice, many levels of hierarchy can exist, and many outer path sums can be on the save stack at one time. For example, if the hierarchy has ten levels, then nine outer path sums can be saved on the stack when the inner most region is traversed. As the regions exit, hierarchical profile indicators are updated and outer path sums are popped from the stack.

The stack used to save and restore outer path values can be any type of stack, including a hardware stack or a software stack. In some embodiments, data storage mechanisms other than a stack are used. For example, registers can be used, one for each region. When a region is entered, the register holding the outer path value is not disturbed, and the register representing the inner region is used. Even though any type of data storage can be used, this description refers to a stack because of its conceptual simplicity.

One embodiment of a software routine that instruments code using a region-based embodiment is disclosed below as RB_PProf_Main. The results of executing RB_PProf_Main on the software represented by CFGs 300 and 400 result in instrumented software represented by CFG 500.

```
RB_PProf(v, R) {
  Set v as visited
  if v is a region entry e, insert "sum=val(Re(R->e))" in v
  for each backedge v->w
    insert "sum+=val(v->Rx(R)); cnt[sum]++; sum=val(Re(R)->w)" on
      edge v->w
  for each non-backedge v->w
    if (w is an entry to an inner region r)
      Rw = r
      insert "sum+=val(v->Er(r)); push(sum)" on edge v->w
    else if (v is an exit of region R and w is outside R)
      let v be an exit block out of k outer-regions R1, R2, ..., Rk (R1 is R)
        to w in R_{k+1}
      insert "cnt[sum+val(v->Rx(R1))]++" on edge v->w
      for i = 2 to k do
        insert "sum=pop(); cnt[sum+val(Er(R_{i-1})->Rx(Ri))]++" on edge
          v->w
      insert "sum=pop()" on edge v->w
      insert "sum+=val(Er(Rk)->w)" on edge v->w
      Rw = R_{k+1}
    else
      insert "sum+=val(v->w)" on edge v->w
      Rw = R
    if (w is not visited)
      RB_PProf(w, Rw)
}
RB_Pprof_Main() { for each entry node e of out-most region R, do
  RB_PProf(e, R) }
```

The RB_PProf function traverses edges starting at an entry node, recursively calls itself for each node encountered, and inserts instructions that instrument the software for profiling purposes. The RB_PProf_Main routine calls RB_PProf function once for every entry node in the outer-most region R, such that the entire control flow graph is traversed and the entire software program is instrumented.

The "val" array referenced in RB_PProf is an array that holds edge values for each edge in the CFG. The val array is filled with edge values generated by the BL method and shown in CFGs 300 and 400.

It is possible that an exit node is a source node for an edge that has a target node more than one level up in the hierarchy. In this case, multiple profile indicators are updated when the region exits. This is shown in RB_PProf in the "for" loop having "k" as a loop variable. "k" represents the number of hierarchical levels that are crossed when the region exits. For example, when k equals one, the stack is popped once and the profile indicator array is updated once. When k equals two, the stack is popped twice and two profile indicator array updates are performed.

The "cnt" array in RB_PProf represents the array of profile indicators for the region being instrumented. When the profiled software is executed, and the cnt array is accessed, it has a scope local to the region being profiled such that a different array of profile indicators is accessed by each region. This is more fully explained below with reference to FIGS. 6A and 6B.

In some embodiments the insertion of instructions on an edge v->w is performed by inserting the instructions in a new block x, and modifying the control flow graph by removing the edge v->w and adding the edges v->x and x->w.

Hierarchical Profiles in Region-Based Embodiments

Figure 6B:
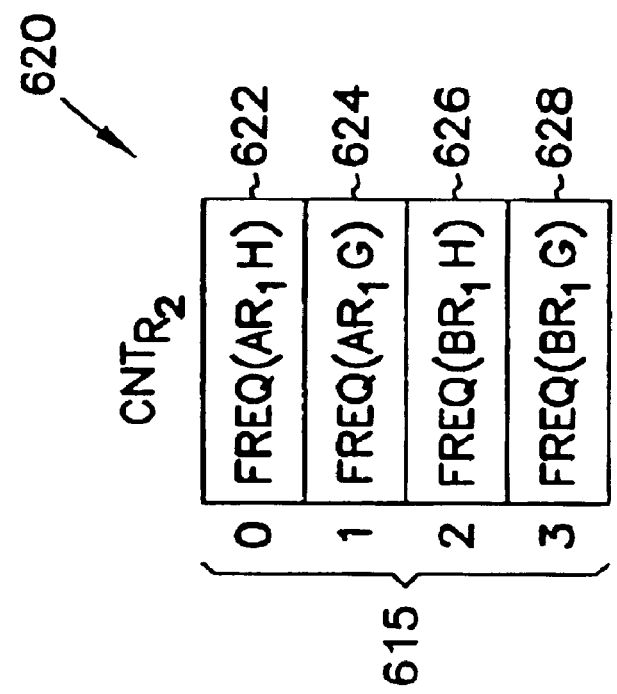
FIGS. 6A and 6B show profile indicator arrays in accordance with a region-based embodiment.
Figure 6A:
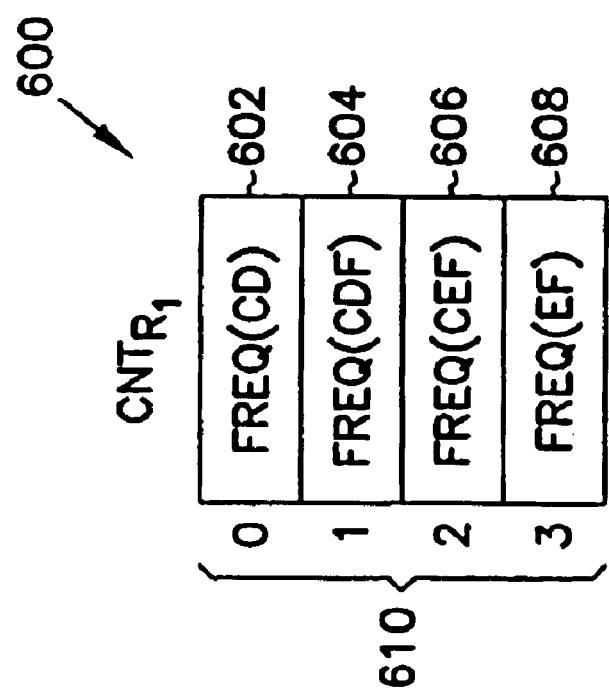

FIGS. 6A and 6B show profile indicator arrays in accordance with a region-based embodiment. FIG. 6A shows profile indicator array 600 which includes profile indicators 602, 604, 606, and 608. Each of the profile indicators in profile indicator array 600 is uniquely addressed by one of path sums 610. For example, profile indicator 602 corresponds to the frequency of execution of path CD in region $R_1$, and is addressed by a path sum value of zero. Profile indicators 604, 606, and 608 correspond to the frequency of execution of paths CDF, CEF, and EF respectively, and each is uniquely addressed by the appropriate path sum value.

FIG. 6B shows profile indicator array 620 which includes profile indicators 622, 624, 626, and 628. Each of the profile indicators in profile indicator array 620 is uniquely addressed by one of path sums 615. For example, profile indicator 622 corresponds to the frequency of execution of hierarchical path $AR_1H$ in region $R_2$, and is addressed by a path sum value of zero. Profile indicators 624, 626, and 628 correspond to the frequency of execution of paths $AR_1G$, $BR_1H$, and $BR_1G$ respectively, and each is uniquely addressed by the appropriate path sum value.

As previously discussed with reference to FIGS. 3B and 4B, path sums are unique within a region but may not be unique when considered in light of path sums for other regions. Such is the case in this example, where both regions $R_1$ and $R_2$ have path sums from zero to three. Ambiguities are avoided by providing a different profile indicator array for each region. For example, profile indicator array 600 corresponds to region $R_1$ and profile indicator array 620 corresponds to region $R_2$. In this example, two profile indicator arrays exist because two regions exist. In actual practice, many more than two regions can exist, and many more than two profile indicator arrays can also exist.

In some embodiments, a hash table is employed to implement profile indicator array 620. A hash table can provide efficient use of resources when the profile indicator array is very sparse.

Global-Based Embodiments

Figures 7A, 7B:
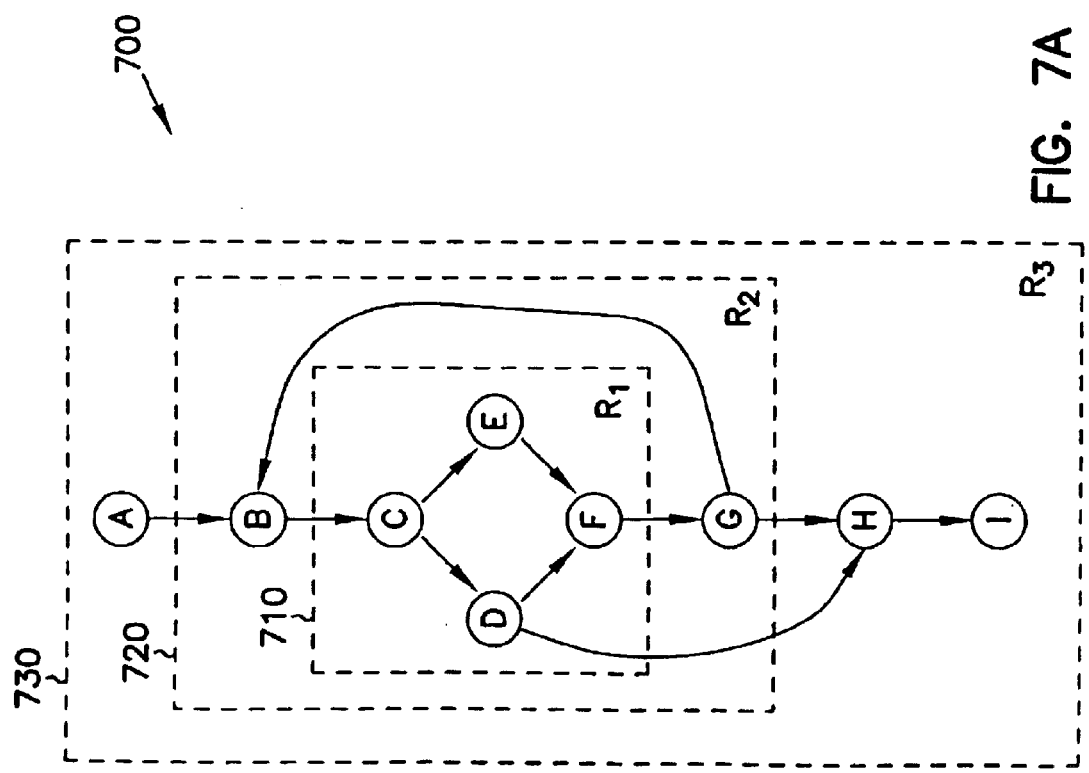
FIGS. 7A and 7B show a second hierarchical control flow graph and the corresponding hierarchical paths.
Figures 8A, 8B:
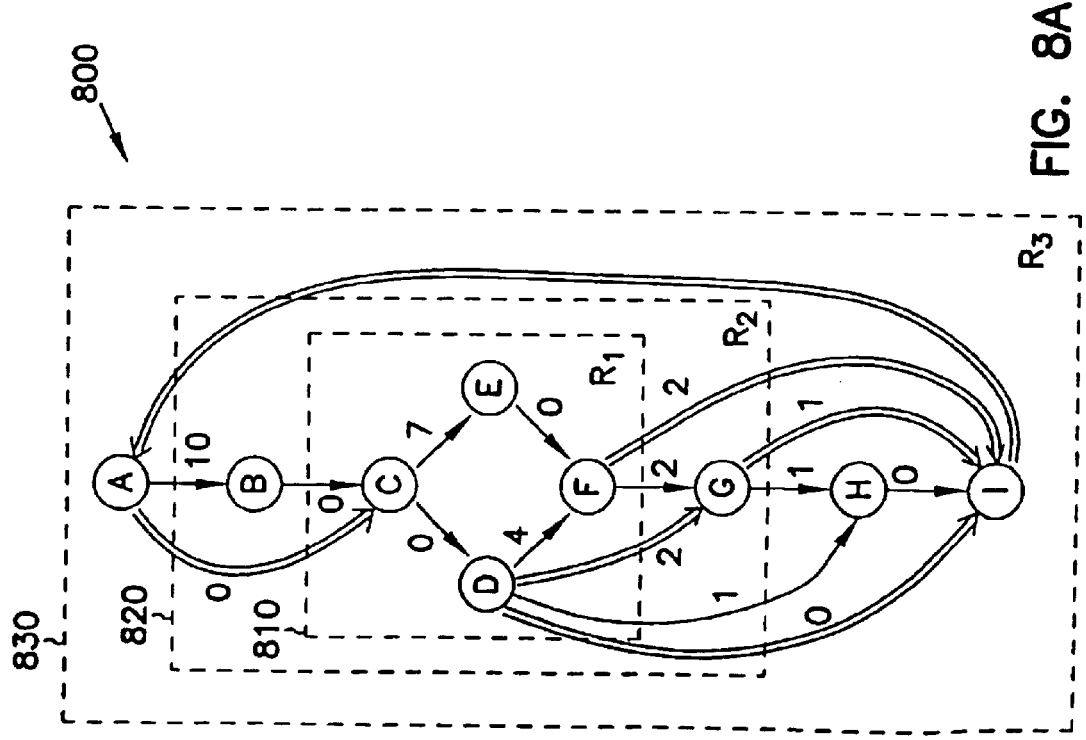
FIGS. 8A and 8B show an augmented control flow graph and the corresponding profiled paths in accordance with a global-based embodiment.
Figure 9:
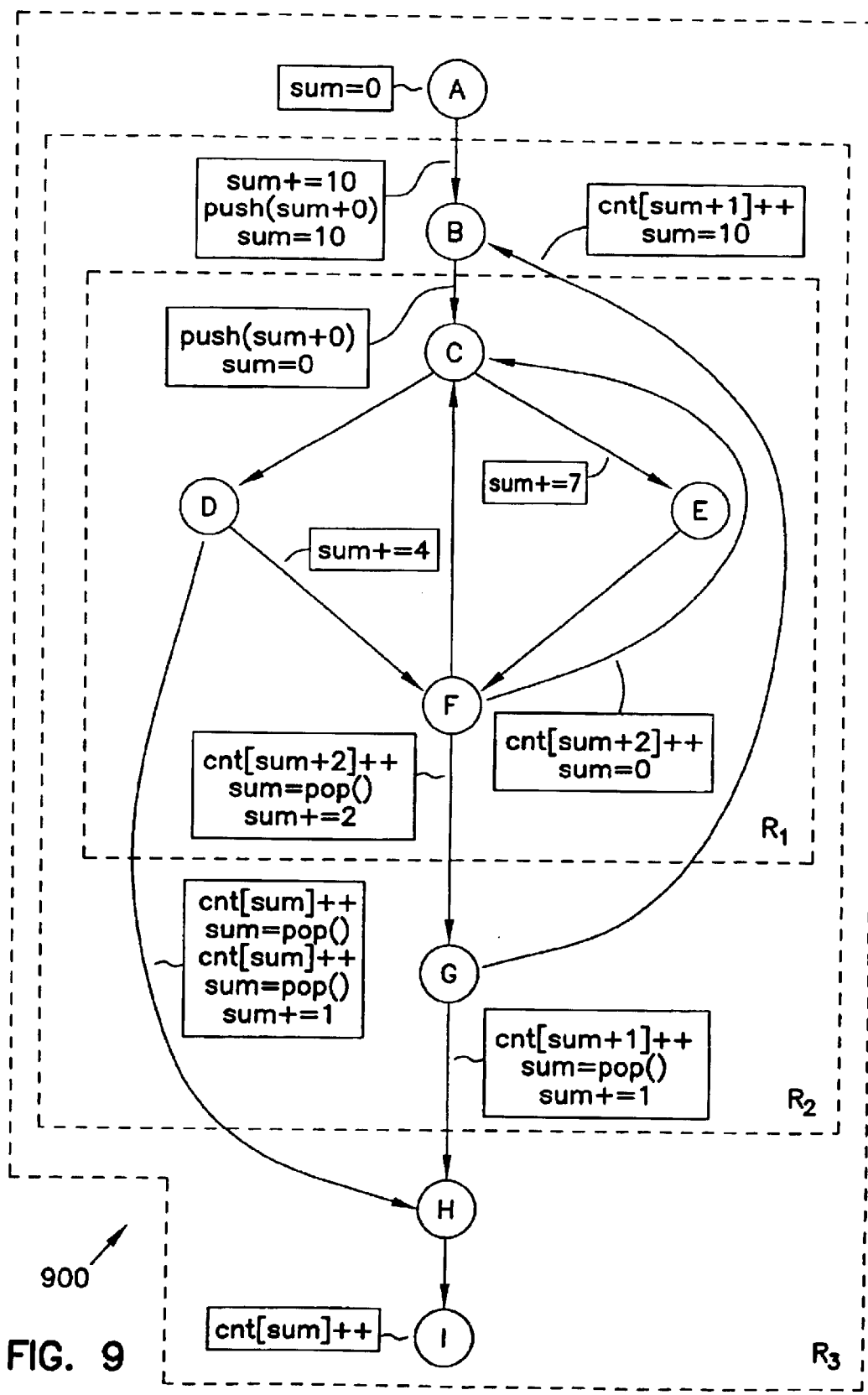
FIG. 9 shows software instrumentation in accordance with a global-based embodiment.

FIGS. 7A and 7B show a hierarchical control flow graph and the corresponding hierarchical paths. FIG. 7A shows a control flow graph CFG 700 that includes regions 710, 720, and 730 arranged hierarchically. Region 710 is an innermost region, region 720 is an outer region to region 710, and region 730 is an outer region to region 720. In FIGS. 7A, 8A, and 9, modified versions of CFG 700 are presented as different CFGs. The numbered designations change from figure to figure because the CFG has undergone change, but the "R" designations do not change so that the underlying software regions can be tracked from figure to figure as the CFG changes. Note that the regions in the global-based embodiments discussed with reference to FIGS. 6A-10 do not necessarily correspond to the regions in the region-based embodiments discussed above.

The hierarchical paths within CFG 700 are shown in FIG. 7B as a list of nodes. A path is traversed when the corresponding nodes are visited as the software code within the region is executed. Within region 710 (also denoted region $R_1$), the possible paths are CD, CDF, and CEF shown as paths 750 in FIG. 7B. Region 710 has a single entry node C, and has two exit nodes, D and F. Paths 750 represent all possible paths from each entry node to each exit node within region 710.

FIG. 7B also shows hierarchical paths 760 for region 720, and hierarchical paths 770 for region 730. Hierarchical paths treat inner regions as single nodes. For example, in paths within region 720, region 710 is listed as a single node represented as $R_1$. The possible paths within region 720 are listed as $BR_1$, and $BR_1G$. Region 720 has a single entry node B, and has two exit nodes, D and G. Paths 760 represent all possible paths from each entry node to each exit node within region 720. In paths within region 730, region 720 is listed as a single node represented as $R_2$. The only possible path in region 730 is $AR_2HI$.

In some embodiments, CFG 700 is a sub-graph of a larger graph (not shown) that represents a larger portion of the software program, and as a result, region 730 can be a region at an intermediate level in the hierarchy of a software program. CFG 700 includes three hierarchical levels of inner regions. Region 720 is one level lower than region 730, and region 710 is one level lower than region 720. When CFG 700 is a sub-graph of a larger CFG, region 730 represents an inner region to the next level outer region (not shown). The method of the present invention can be applied at any level in the hierarchy. In this description, the method is described with respect to the three levels of hierarchy represented by regions 710, 720, and 730.

In this example, the software represented by CFG 700 is a complete function. For ease of reference, node A is referred to as a function entry node, and node I is referred to as a function exit node. In practice, when CFG 700 represents less than a complete function, node A is the outer-most region entry node, and node I is the outer-most region exit node. For the purposes of this description, an outer-most entry node can serve as a function entry node, and an outer-most exit node can serve as a function exit node.

An overview of the global-based embodiments is now presented. Further detailed descriptions are provided below. Unlike the region-based embodiments, separate augmented CFGs for each region are not created in the global-based embodiments. Instead, the CFG representing the software is augmented as a single CFG. When augmenting a region in the CFG, each inner region is represented by a representative path within the inner region. The representative path is identified by a "representative entry node," and a "representative exit node." The CFG is augmented with extra edges if necessary, and edge values are assigned using the BL method. The software is instrumented by inserting profiling instructions, and when the software is executed, hierarchical profile information is gathered.

Augmenting Control Flow Graphs and Assigning Edge Values in Global-Based Embodiments FIGS. 8A and 8B show an augmented control flow graph and the corresponding profiled paths in accordance with a global-based embodiment. FIG. 8A shows augmented CFG 800 that corresponds to CFG 700 (FIG. 7A). Regions 710, 720, and 730 have been modified, and appear in FIG. 8A as regions 810, 820, and 830 respectively. Modifications include the removal of backedges, and the addition of edges to and from region entry and exit nodes. Edges that have been added in FIG. 8A are shown in double lines.

In general, global-based augmentation of CFGs follows the outline presented as numbered actions below. The numbering is provided for clarity in organization and does not imply an order of operations. Indeed, the order can be different than that presented without departing from the scope of the present invention. Each action is presented in more detail after the outline. The current region is denoted as "R," and inner regions are denoted as "r." The CFG for the current region is denoted as CFG(R), and the CFG for inner regions is denoted as CFG(r).

Outline of global-based augmentation:
1. Select representative paths within regions.
2. Remove all backedges.
3. Add an edge from the function exit node to the function entry node.
4. For each region R add the following edges (if not already existing):
   4a. Add an edge from the function entry node to each entry node of R.
   4b. Add an edge from each exit node of R to the function exit node.
   4c. Add an edge from each prolog node of R to the representative entry node of R.
   4d. Add an edge from the representative exit node of R to each epilog node of R.

Further description of global-based augmentation:
1. Select representative paths within regions. One path in each region is selected as a representative path Pr(R) for the region. The representative path Pr(R) is identified by the representative entry node Er(R) and the representative exit node Xr(r). FIG. 8B shows regions 850, hierarchical paths 860, and the corresponding FIG. 8A paths 870. Within FIG. 8B, regions and their representative paths are underlined. For example, the representative path chosen for $R_1$ is CD, and the FIG. 8A path for hierarchical path BR, is shown as ABCDI. Also for example, the representative path for $R_2$ is BCD, and the FIG. 8A path for hierarchical path $AR_2HI$ is shown as ABCDHI.
2. Remove all backedges. Backedge G->B is removed. Backedge source nodes are treated as region exit nodes, and backedge target nodes are treated as region entry nodes. In this example, G is already a region exit node, and B is already a region entry node, so they are not treated differently.
3. Add an edge from the function exit node to the function entry node. Edge I->A is shown added to CFG 800.
4a. Add an edge from the function entry node to each entry node of R. Edge A->C is added from the function entry node to the entry node of $R_1$. Edge A->B was already existing as an edge from the function entry node to the entry node of $R_2$, and so was not added.
4b. Add an edge from each exit node of R to the function exit node. Edges F->I and D->I are added as edges from exit nodes of RR to the function exit node. Edge G->I is added as an edge from the exit node of $R_2$ to the function exit node.
4c. Add an edge from each prolog node of R to the representative entry node of R. In CFG 800, both $R_1$ and $R_2$ have a single entry node and a single prolog node. In each case, the single entry node serves as the representative entry node, and an edge already exists from the single prolog node to the representative entry node. In the example of FIG. 8A, no new edges are added from prologs to representative entries.
4d. Add an edge from the representative exit node of R to each epilog node of R. The representative exit node of $R_1$ is D. Edge D->G is added because D is the representative exit node of $R_1$ and G is an epilog node of $R_1$.

In some embodiments, the size of the profile indicator array is reduced by removing the edges from prolog nodes to non-representative entry nodes and from non-representative entry nodes to epilog nodes before assigning edge values. This is explained more fully below with reference to FIG. 10.

After undergoing the augmentation process, the control flow graph is in a form that can be subjected to the BL method. As shown in FIG. 8B, each hierarchical path 860 in CFG 800 corresponds to a plain path 870 in CFG 800. The BL method assigns edge values such that each plain path in the CFG receives a unique path sum. For the case of augmented CFG 800, each hierarchical path corresponds to a plain path, and so the hierarchical paths are assigned unique path sums.

After the BL method is applied, each edge p->e (where e is an entry node of an inner region and p is a prolog node) is reassigned the value assigned to edge p->Er(r). Similarly, each edge x->o (where x is an exit node of an inner region and x is an epilog node) is reassigned the value assigned to edge Xr(r)->o. The reassigment of edge values forces those plain paths that correspond to the same hierarchical path to have the same path sum value.

Figure 10:
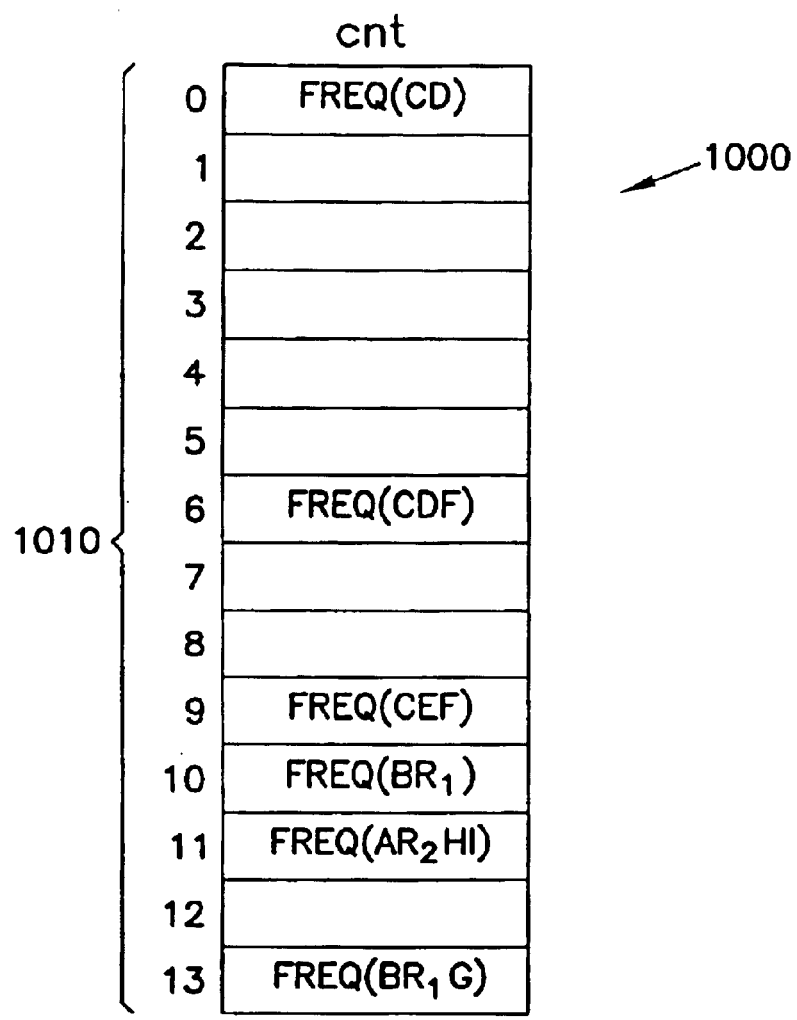
FIG. 10 shows a profile indicator array in accordance with a global-based embodiment.

The complete set of plain paths in CFG 800 is larger than the set of hierarchical paths. Because the BL method assigns unique path sums to all plain paths in the CFG, the hierarchical paths utilize a subset of the unique path sums. Path sums 880 for the hierarchical paths in CFG 800 are shown in FIG. 8B. Because the hierarchical paths can be a subset of the set of plain paths, the profile indicator array can be sparsely populated, which is shown in FIG. 10 below. Sparseness can be reduced by removing the edges from prolog nodes to non-representative entry nodes and from non-representative entry nodes to epilog nodes before assigning edge values.

FIG. 8A shows the edge values assigned to edges after the BL method is applied, and after the reassignment of some edge values as discussed above. The edge values are shown next to the edges in CFG 800. For example, edge A->B has an edge value of ten and edge F->I has an edge value of two. Path sums are generated by summing the edge values along the paths as they are traversed. For example, path ABCDGI has a path sum of thirteen because edges A->B, D->G, and G->I are traversed on the path. The code that generates the path sums during execution and the arrangement of the profile indicators are discussed below.

Software Instrumentation in Global-Based Embodiments

FIG. 9 shows software instrumentation in accordance with a global-based embodiment. The instrumentation includes instructions inserted into the program code. As a result of the instrumentation, profile indicators are modified when the program is executed. One profile indicator is maintained for each hierarchical path present in the program.

The original program is instrumented such that when a path P in a region completes execution, a variable holds the sum value of path P. Augmented CFG 800 provides information for instrumenting edges and blocks in the original CFG (CFG 700) to obtain the sum values and modify profile indicators. The original CFG is shown in FIG. 9 with appropriate instrumentation added.

The instrumented program saves the current outer path sum when entering a region, and restores the outer path sum when exiting the region. In between, the path sum is used to collect path information for the hierarchical path in the inner region. For example, in FIG. 9, the path sum is maintained in a variable named "sum." To illustrate the profiling operation, the operations performed when the path ABCEF-GHI is traversed is now explained.

The path sum is initialized to zero in node A because this is the start of the profiled software. The current path sum value, hereinafter referred to as the $R_3$ path sum, corresponds to the hierarchical path in $R_3$. As path sum values are pushed on the stack, the current path sum corresponds to inner regions $R_2$ and $R_1$. These path sums are referred to as the $R_2$ path sum and $R_1$ path sum, respectively.

On the edge A->B, the $R_3$ path sum has a value of ten summed therewith because this is the edge weight of A->B. The $R_3$ path sum is pushed on the stack, and the $R_2$ path sum is initialized to ten on the execution of edge A->B because that is the edge value assigned to the edge from the function entry node to the representative entry node of $R_2$. On the edge B->C, zero is summed with the $R_2$ path sum because that is the edge value of B->C, and then the $R_2$ path sum is pushed on the stack. Upon entering $R_1$, the $R_1$ path sum is initialized to zero because that is the edge value assigned to the edge from the function entry node (A) to the representative entry node (C). The $R_1$ path sum has seven summed therewith on the edge C->E, and then zero summed therewith on the edge E->F.

On the edge F->G, execution is leaving RX, so the hierarchical profiling of $R_1$ is completed and the appropriate profile indicator is updated. First, a value of two is summed with the $R_1$ path sum because that is the value assigned to the edge from the region exit node to the function exit node. This gives the $R_1$ path sum a value of nine, which corresponds to path CEF in $R_1$, as shown in FIG. 8B. The "cnt" array is indexed with the $R_1$ path sum, and the appropriate profile indicator is incremented.

The $R_2$ path sum, which currently has a value of ten, is then popped from the stack, and a value of two is summed therewith because that is the edge value assigned to edge F->G. At this point, as execution leaves $R_2$, the appropriate profile indicator is updated. First, a value of one is summed with the $R_2$ path sum because that is the value of the edge from the region exit node (G) to the function exit node (I). At this point, the $R_2$ path sum has a value of 13, which corresponds to the hierarchical path $BR_1G$ in FIG. 8B. The "cnt" array is indexed, and the appropriate profile indicator is updated.

The $R_3$ path sum, which currently has a value of ten, is then popped from the stack. A value of one is summed therewith, because that is the value assigned to edge G->H. Upon reaching the function exit node, the $R_3$ path sum is eleven, and the appropriate profile indicator is updated. A path sum of eleven corresponds to hierarchical path $AR_2HI$, as shown in FIG. 8B.

The remaining instrumentation in CFG 900 works in substantially the same manner. In general, when a region is entered, the outer path sum is saved, and the inner path sum is initialized. Edge values on the inner path are summed as the edges are traversed, and when the region exits, a profile indicator is updated and the outer path sum is restored.

In the example embodiment of FIG. 9, only three levels of hierarchy are present. In practice, many levels of hierarchy can exist, and many outer path sums can be on the save stack at one time. For example, if the hierarchy has ten levels, then nine outer path sums can be on the save stack when the inner most region is traversed. As the regions exit, hierarchical profile indicators are updated and outer path sums are popped from the stack.

One embodiment of a software routine that instruments code using a global-based embodiment is disclosed below as GPProf_Main( ). The results of executing GPProf_Main( ) on the software represented by CFG 800 results in instrumented software represented by CFG 900.

```
GPProf (v, R) {
set v as visited
if v is a function entry, insert "sum=0" to v
for each backedge v->w
   /* fe is the function entry node and fx is the function exit node */
   insert "sum+=val(v->fx); cnt[sum]++; sum=val(fe->w);"on edge v->w
for each non-backedge v->w
   if (w is an entry to inner region r)
      /* val(Pr(r)) is the sum of val on the representative path from Er(r)
   to Xr(r) in the augmented graph */
      insert "sum+=val(v->Er(r)); push(sum+val(Pr(r))); sum=val(fe->w)"
      on edge v->w
      Rw = r
   else if (v is an exit of region R and w is outside R)
      let v be an exit block of k level regions R1, R2, ..., Rk (R is R1) to
w
      in R_{k+1}
      insert "cnt[sum+val(v->fe)]++" on edge v->w
      for i = 1 to k-1 do
         insert "sum=pop(); cnt[sum+val(v->fx)]++" on edge v->w
      insert "sum=pop()" on edge v->w
      insert "sum+=val(Xr(R)->w)" on edge v->w
      Rw = R_{k+1}
   else
      insert "sum+=val(v->w)" on edge v->w
      Rw = R
   if (w is not visited)
      GPProf(w, Rw)
}
GPProf_Main() { for function entry fe in the out-most region R, do
GPProf (fe, R); }
```

GPProf is called by the main routine GPProf_Main with the function entry node and region as arguments. In this example, the function entry corresponds to node A. When GPProf is called with A as an argument, the instrumentation shown in FIG. 9 results. As shown in GPProf, the "val" array holds the edge weights.

Hierarchical Profiles in Global-Based Embodiments

FIG. 10 shows a profile indicator array in accordance with a global-based embodiment. The "cnt" array 1000 includes profile indicators for the hierarchical paths in CFG 900. Each profile indicator is addressed with a unique path sum 1010. A single profile indicator array 1000 exists for the profiled software. The array of profile indicators is sparsely populated in part because unique path sums were given to each plain path in CFG 800, and only the plain paths that represent hierarchical paths are used.

In some embodiments, the size of the profile indicator array is reduced by removing the edges from prolog nodes to non-representative entry nodes and from non-representative entry nodes to epilog nodes before assigning edge values. These edges represent non-profiled paths, and removing them reduces the number of unique path sum assignments while still assigning path sums to all hierachical paths. In some embodiments, sum values belonging to the same region are clustered together. This enables more flexible profiling instrumentation.

In some embodiments, the size of the profile indicator array is reduced by using a heuristic for selecting representative paths for a region. One objective of the heuristic can be to reduce added edges or to reduce profiling overhead.

In some embodiments, a hash table is employed to implement profile indicator array 1000. A hash table can provide efficient use of resources when the profile indicator array is very sparse.

Figure 11:
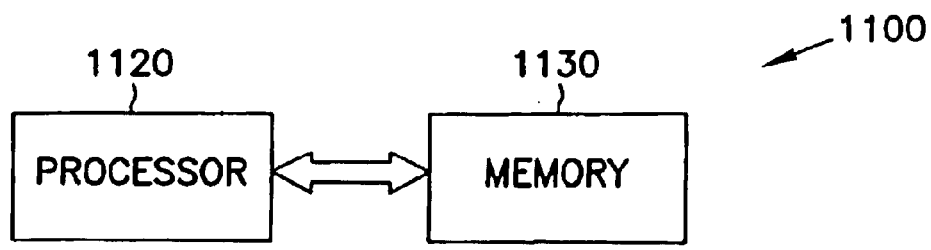
FIG. 11 shows a processing system in accordance with an embodiment of the invention.

FIG. 11 shows a processing system according to one embodiment of the invention. Processing system 1100 includes processor 1120 and memory 1130. In some embodiments, processor 1120 is a processor capable of executing instrumented software for hierarchical profiling. Processor 1120 can also be a processor capable of augmenting control flow graphs. Processing system 1100 can be a personal computer (PC), mainframe, handheld device, portable computer, set-top box, or any other system that includes software.

In some embodiments, processor 1120 includes cache memory, a memory controller, or a combination of the two. In these embodiments, processor 1120 may access a profile indicator array without accessing memory 1130. In other embodiments, profile indicators are maintained within memory 1130, and processor 1120 accesses memory 1130 when updating profile indicators regardless of whether processor 1120 includes cache memory or memory controllers.

Memory 1130 can be a hard disk, a floppy disk, random access memory (RAM), read only memory (ROM), flash memory, or any other type of machine medium readable by processor 1120. Memory 1130 can store instructions for performing the execution of the various method embodiments of the present invention.

CONCLUSION

A hierarchical software profiling mechanism that gathers hierarchical path profile information has been described. Software to be profiled is instrumented with instructions that save an outer path sum when an inner region is entered, and restore the outer path sum when the inner region is exited. When the inner region is being executed, an inner path sum is generated and a profile indicator representing the inner path traversed is updated prior to the outer path sum being restored.

The software to be profiled is instrumented using information from augmented control flow graphs that represent the software. In region-based embodiments, each region is represented by a separate control flow graph, and a separate array of profile indicators is generated for each region. Within each control flow graph, inner regions are replaced by a representative node. In global-based embodiments, one control flow graph is maintained, and one array of profile indicators is generated. The array of profile indicators may be sparsely populated.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   generating a control flow graph of a program, the graph having an inner region with multiple entry nodes, and an outer region;
   selecting a single one of the existing entry nodes as a representative entry node for the inner region;
   replacing the inner region with the representative entry node;
   for each prolog node of the inner region having an edge to one of the existing entry nodes other than the representative entry node, adding an edge from the prolog node to the representative entry node; and
   for each epilog node of the inner region, adding an edge from the representative entry node to the epilog node;
   assigning edge values to all edges in the control flow graph such that the sum of the edge values along each unique path is unique within the control flow graph.

2. The computer-implemented method of claim 1 further comprising:
   creating a region source node for the outer region;
   for each entry node of the outer region, adding an edge from the region source node to the entry node;
   creating a region sink node for the outer region; and
   for each exit node of the outer region, adding an edge from the exit node to the region sink node.

3. The computer-implemented method of claim 2 wherein the control flow graph includes a plurality of inner regions, and the actions of the method are applied for each of the plurality of inner regions, such that a different augmented control flow graph is created for each of the plurality of inner regions.

4. The computer-implemented method of claim 2 wherein the control flow graph includes a hierarchy of inner regions, and the actions of the method are applied recursively to the hierarchy of inner regions, such that a different augmented control flow graph is created for each inner region in the hierarchy of inner regions.

5. A computer-implemented method comprising:
   in a control flow graph, selecting a representative path within an inner region, having entry and exit nodes that define prolog and epilog nodes, of a software function having a function entry and a function exit, the representative path being identified by a single entry node selected from among multiple existing entry nodes of the inner region, and a single representative exit node selected from among multiple existing exit nodes of the inner region;
   adding an edge from the function entry to each entry node of the inner region;
   adding an edge from each exit node of the inner region to the function exit;
   for each prolog node of the inner region having an edge to one of the existing entry nodes that is not the representative entry node, adding an edge from the prolog node to the representative entry node; and
   for each epilog node of the inner region having an edge to one of the existing exit nodes that is not the representative exit node, adding an edge from the representative exit node to the epilog node; and
   assigning edge values to all edges in the control flow graph such that the sum of the edge values along each unique path is unique within the control flow graph.

6. The computer-implemented method of claim 5 further comprising:
   removing any edges from prolog nodes of the inner region to entry nodes of the inner region other than the representative entry node; and
   removing any edges from exit nodes of the inner region other than the representative exit node to epilog nodes of the inner region.

7. The computer-implemented method of claim 5 wherein the software function has a function entry and a function exit, and the inner region has at least one entry node and at least one exit node, the method further comprising:
  adding an edge from the function entry to each of the at least one entry node of the inner region; and
  adding an edge from each of the at least one exit node of the inner region to the function exit.

8. The computer-implemented method of claim 5 wherein the control flow graph includes a plurality of inner regions, and the actions of the method are applied for each of the plurality of inner regions.

9. The computer-implemented method of claim 5 wherein the control flow graph includes a hierarchy of inner regions, and the actions of the method are applied recursively to the hierarchy of inner regions.

10. A computer-implemented method comprising:
  dividing the control flow graph (CFG) of a program into a plurality of hierarchical regions, at least some of the regions having multiple entry nodes and/or multiple exit nodes;
  selecting one or the regions;
  replacing an inner region with respect to the selected region by a representative node;
  adding source and sink nodes to the CFG of the one region;
  if the one region has multiple entry nodes, adding an edge from the source node to all the entry nodes of the one region;
  if the one region has multiple exit nodes, adding an edge from all the exit nodes of the one region to the sink node;
  assigning identifiers to the edges in the one region, including the added edges so as to produce a unique combination of the identifiers for each path in the region, including paths from the source node and to the sink node.

11. The method of claim 10 where the identifiers are numbers.

12. The method of claim 11 where the combination is a sum.

13. The method of claim 10 further comprising instrumenting at least some of the edges of the CFG.

14. The method of claim 10 further comprising:
  executing code within the region, entering the region at one of the entry nodes, and exiting the region at one of the exit nodes;
  combining the identifiers of those edges executed within the region to produce the combination.

15. The method of claim 14 further comprising initializing the combination after code execution reaches the one entry node from outside the region.

16. The method of claim 15 where
  the region has multiple entry nodes, only one of which is executed during a single execution of the region;
  the combination is initialized to different ones of the identifiers, depending upon which of the multiple entry nodes is executed during the single execution.

17. The method of claim 14 further comprising storing the combination upon exiting the region from the one exit node.

18. The method of claim 17 where the region has multiple exit nodes, only one of which is executed during a single execution of the region.

19. A computer-readable medium bearing instructions executable by a computer for carrying out the method of:
  dividing the control flow graph (CFG) of a program into a plurality of hierarchical regions, at least one of the regions having multiple entry nodes and/or multiple exit nodes;
  selecting one or the regions;
  replacing an inner region with respect to the selected region by a representative node;
  adding source and sink nodes to the CFG of the one region;
  if the one region has multiple entry nodes, adding an edge from the source node to all the entry nodes of the one region;
  if the one region has multiple exit nodes, adding an edge from all the exit nodes of the one region to the sink node;
  assigning identifiers to the edges in the one region, including the added edges so as to produce a unique combination of the identifiers for each path in the region, including paths from the source node and to the sink node.

20. A computer-implemented method comprising:
  generating a control flow graph (CFG) of a program for profiling, the program having a number of existing edges, a function entry node, and a function exit node;
  dividing the CFG into multiple hierarchical regions comprising outer and inner regions each having at least one region entry node and at least one region exit node;
  selecting representative paths within the regions;
  inserting additional edges into the CFG to produce an augmented CFG, at least one of the edges extending between an outer one of the regions and an inner one of the regions;
  assigning edge identifiers to the existing edges and to at least some of the additional edges such that any path, including paths through the some additional edges, in the augmented CFG has a unique combination of edge identifiers.

21. The method of claim 20 where the identifiers are numbers.

22. The method of claim 21 where the combination is a sum.

23. The method of claim 20 further comprising, for at least some of the regions having multiple paths therethrough, selecting one of the multiple paths as a representative path.

24. The method of claim 20 further comprising removing backedges from the regions.

25. The method of claim 20 where inserting includes inserting additional edges from the function entry node to the region entry node(s) of the hierarchical regions.

26. The method of claim 25 where inserting includes inserting additional edges to all of the region entry nodes of those regions having multiple region entry nodes.

27. The method of claim 20 where inserting includes inserting additional edges from the function exit node(s) of the hierarchical regions to the function exit node.

28. The method of claim 27 where inserting includes inserting additional edges from all of the region exit nodes of those regions having multiple region exit nodes.

29. The method of claim 20 further comprising selecting a single representative entry node for each of the regions having multiple entry nodes.

30. The method of claim 29 where inserting includes, for each region, inserting additional edges from prolog nodes of the each region to the representative entry node of that region.

31. The method of claim 20 further comprising selecting a single representative exit node for each of the regions having multiple exit nodes.

32. The method of claim 31 where inserting includes, for each region, inserting additional edges from the representative exit node to the epilog nodes of the each region.

33. The method of claim 20 further comprising instrumenting the existing edges of the augmented CFG.

34. The method of claim 20 further comprising:
executing code so as to follow one of multiple plain paths through the program;
combining the identifiers of those edges executed within the program to produce the combination.

35. The method of claim 34 further comprising:
accessing one of an array of counters specified by the combination representing the one plain path;
modifying the one counter.

36. The method of claim 35 where the number of counters is less than the possible number of plain paths through the program.

37. A computer-readable medium bearing instructions executable by a computer for carrying out the method of:
generating a control flow graph (CFG) of a program for profiling, the program having a number of existing edges, a function entry node, and a function exit node;
dividing the CFG into multiple hierarchical regions comprising outer and inner regions each having at least one region entry node and at least one region exit node;
selecting representative paths within the regions;
inserting additional edges into the CFG to produce an augmented CFG, at least one of the edges extending between an outer one of the regions and an inner one of the regions;
assigning edge identifiers to the existing edges and to at least some of the additional edges such that any path, including paths through the some additional edges, in the augmented CFG has a unique combination of edge identifiers.

38. A computer-readable medium bearing instructions executable by a computer for carrying out the method of:
generating a control flow graph of a program, the graph having an inner region with multiple entry nodes and defining prolog and epilog nodes, and an outer region;
selecting a single one of the existing entry nodes as a representative entry node for the inner region;
replacing the inner region with the representative entry node;
for each prolog node of the inner region having an edge to one of the existing entry nodes other than the representative entry node, adding an edge from the prolog node to the representative entry node; and
for each epilog node of the inner region, adding an edge from the representative entry node to the epilog node;
assigning edge values to all edges in the control flow graph such that the sum of the edge values along each unique path is unique within the control flow graph.

39. A computer-readable medium bearing instructions executable by a computer for carrying out the method of:
in a control flow graph, selecting a representative path within an inner region, having entry and exit nodes that define prolog and epilog nodes, of a software function having a function entry and a function exit, the representative path being identified by a single entry node selected from among multiple existing entry nodes of the inner region, and a single representative exit node selected from among multiple existing exit nodes of the inner region;
adding an edge from the function entry to each entry node of the inner region;
adding an edge from each exit node of the inner region to the function exit;
for each prolog node of the inner region having an edge to one or the existing entry nodes that is not the representative entry node, adding an edge from the prolog node to the representative entry node; and
for each epilog node of the inner region having an edge to one of the existing exit nodes that is not the representative exit node, adding an edge from the representative exit node to the epilog node; and
assigning edge values to all edges in the control graph such that the sum of the edge value along each unique path is unique within the control flow graph.

* * * * *